United States Patent [19]

Weatherly et al.

[11] Patent Number: 4,501,782

[45] Date of Patent: Feb. 26, 1985

[54] METHOD FOR BONDING WEBS EMPLOYING ULTRASONIC ENERGY

[75] Inventors: Gilbert Weatherly; A. MacDonald Slade, both of Solano Beach, Calif.

[73] Assignee: MAC/GIL Ltd., Solano Beach, Calif.

[21] Appl. No.: 553,149

[22] Filed: Nov. 18, 1983

[51] Int. Cl.³ .............................................. B32B 3/00
[52] U.S. Cl. ..................................... 428/57; 156/73.2; 156/73.4; 156/217; 156/227; 428/192; 428/193
[58] Field of Search .................. 428/192, 193, 57, 58, 428/257; 156/73.2, 73.4, 217, 227

[56] References Cited

U.S. PATENT DOCUMENTS 3,966,519  6/1976  Mitchell et al. ..................... 156/73.1

Primary Examiner—James J. Bell
Attorney, Agent, or Firm—Weingarten, Schurgin, Gagnebin & Hayes

[57] ABSTRACT

A method for bonding thermoplastic webs includes the steps of interdigitating the ends of the warps at opposing web edges, with the length of the interdigitation insuring that the end of an interdigitated filament overlies the first shute of the opposing web, and with the interdigitated fibers being subsequently ultrasonically bonded in a continuous manner across the width of the web so that the ends are crushed down and flattened over the corresponding shute. The warp ends may overlie a number of opposing shutes as long as the overlap is no more than 1½ times the thickness of the web. The web bonding method for producing a continuous belt produces a web joint which is substantially coplanar with the remainder of the web such that the web is uniquely adapted to papermaking processes which avoids bumps or ripples in the sluice that solidifies on the web. In a further embodiment, ultrasonic energy is utilized to bind the web edges.

18 Claims, 6 Drawing Figures

METHOD FOR BONDING WEBS EMPLOYING ULTRASONIC ENERGY

BACKGROUND OF THE INVENTION

This invention relates to a continuous loop web in which the ends of the web are mated in a seam that is both strong and substantially flat with respect to the remainder of the web such that the web may be utilized for papermaking processes.

BACKGROUND OF THE INVENTION

Continuous loop type belts have been utilized in the past for transporting slurry in a papermaking process in which seaming thermoplastic mesh fabrics has been accomplished by means of an ultrasonic welding tool. Such a system is illustrated in U.S. Pat. No. 4,090,897 in which butt seaming is discussed. In this patent the outermost weft or shute filaments of the opposed edges of the plastic fabric are replaced by one heat stabilized filament and the picket ends of the fabric are interdigitated and butted above the heat stabilized filament preparatory to the welding step. While this patent describes interdigitation, such interdigitation without overlap is extremely difficult to achieve and requires the utilization of a replacement weft or shute filament. Moreover, butting of individual fibers has never proved practical; nor has the required seam strength been achieved.

Note that the provision of the treated weft filament is necessary because this patent deals with cloth that has not been heat-set. Moreover, the butt seaming does not yield the required strength for the web, and butting with microscopically thin fiber ends or pickets is extremely difficult. Additionally, this patent describes a series of spot welds as opposed to a continuous welded seam which yields more strength. While this patent also deals with overlap seaming, this patent teaches substantial overlap in which the ends overlap each other by many inches. The result is a weld seam which rises above and below the plane of the web. When this type of loop is utilized in the papermaking industry, the web produces a ripple or bump in the solidifying slurry which is both unacceptable and unpredictable.

U.S. Pat. No. 3,760,186 describes a continuous method for bonding or seaming running webs to provide a seam which simulates a series of stitches. This patent is directed to laminating as opposed to seaming and requires the utilization of an adhesive. Moreover, there is no woven-like material described in this patent but rather a paper tissue.

U.S. Pat. No. 3,399,111 describes the utilization of a supplemental belt in combination with an endless belt in papermaking and a method of installing the supplemental belt. It will be noted that the supplemental belt in this patent is not woven but rather is perforated. Moreover, this patent does not address the problems of seaming a woven belt to obtain a flat seam that does not interfere with the papermaking process.

Reference is also made to U.S. Pat. No. 3,669,599 in which a sonic or ultrasonic seaming apparatus uses substantially overlapping materials and a driven rotating anvil and an opposed resonator, also called a horn, which is coupled to a source of sonic or ultrasonic energy. This particular apparatus, while adaptable to woven textile materials which are partially or entirely of thermoplastic fibers, describes a system in which material is fed into the machine and is stitched very much in the manner of a sewing machine through the utilization of spot welds produced in accordance with power supply pulses. It will also be noted that the body and seam are not coplanar such that a web is not in general useful in the papermaking process.

U.S. Pat. No. 4,083,090, illustrates a system for the butting and fusing together of longitudinal wires at the crossover points, in which no interdigitation occurs. It will be appreciated that it is almost impossible for small microscopic wires to be butted and fused in the manner described in this patent. Also, the strength of merely butted fibers is insufficient for some papermaking operations. In this patent the strands are soldered and are made of metal wire.

This patent also describes the manual interweaving employed in traditional Fourdrinier screens in which manual interweaving of the warp wires with the shute wires is accomplished in a painstakingly slow process. In fact, to date, such manual interweaving has been the sole successful method of providing monofilament, plastic, polyester, or polyethylene terephthalate Fourdrinier screens for the papermaking art, although problems with such manually interwoven loops result in a screen which has a seam which is relatively stiff or rigid in the sense that the wires are too stiff to be manually interwoven into a seam without producing a seam of changed topography.

U.S. Pat. Nos. 3,224,915; 3,462,803; 3,508,989; 3,514,350; 3,728,183; 3,765,973; 3,844,869; 3,874,963; 3,900,354; 4,002,012; 4,032,382; 4,040,885; 4,083,737; 4,259,399; 4,293,355; 4,305,998; and 4,373,653 show various ways of bonding the ends of loops together, with none of the above patents indicating both an interdigitated and overlap procedure combined with ultrasonic bonding to produce a continuous seam which is coplanar with the plane of the web which contains the fibers.

SUMMARY OF THE INVENTION

In contradistinction to the processes or methods described in the above-mentioned patents, in the subject method the butt ends of a loop to be seamed are provided with fibers protruding longitudinally from the end. These fibers are the warp fibers, which are cut to a length which assures that when they are interdigitated with the corresponding warps from the end to be butted, they overlie one shute. In one embodiment, this shute is exposed in between adjacent warps. The warp ends may overlie a number of shutes so long as the total overlay or overlap is less than 1½ times the web thickness. It has been found that the less the overlap, the stronger will be the seam. In order to provide for the appropriate length, one shute of each end is removed to provide the necessary length for the warp fiber ends which resemble "pickets". The woven material or cloth itself is heat-set before seaming thereby eliminating the necessity for providing a heat-treated shute as discussed in the aforementioned patent 4,090,897. Subsequent to the interdigitation, pressure and ultrasonic bonding occurs in which the ends of the warps are flattened over the corresponding shutes to which they are joined, thereby providing a relatively flat unaltered topography for the continuous web.

An ultrasonic horn is moved transversely to the interdigitated and overlapped ends of the warps to provide a continuous seam transverse to the longitudinal axis of the continuous loop web. In this method no butting occurs, with the strength being attributable to the overlap of a warp end with the corresponding shute to which it is welded. In a tensile strength test in which the web is pulled apart at the seam, the strength of the seam, in one embodiment, exceeds a 150 pound pull, with the topography being substantially unaltered to provide a smooth transition over the seam.

The horn of the ultrasonic welding device is moved transverse to the longitudinal direction of the web to provide a continuous seam as opposed to spot welding of the prior art. In one embodiment, not only is the transverse seam subjected to an ultrasonic bonding treatment, but also the longitudinally extending salvage edges of the web are also subjected to an ultrasonic fusion bonding treatment such that the edges of the web are strengthened. Note also that no adhesive is utilized in this process which simplifies the construction of the continuous web as well as making it less expensive and less messy. Moreover, the strands utilized here are extruded strands such that the finished product is not formed from a continuous sheet of material with perforations therein. This invention is also distinguished from the prior methods described in that there is no substantial overlap of one portion of the web with the other that changes significantly the topology in that the substantially overlapped seam is not coplanar with the remainder of the web. The only portion of the overlap is that of the individual warp strands with an individual shute, with the ends of the warps being flattened down over the corresponding shute thereby to provide little if any change in the topology. The pattern of interdigitation above and below the corresponding shute may be random as the butting edges are forced together. In another embodiment, with webs having two warps above a shute and one below, this pattern is repeated when the butt ends are forced together prior to welding.

BRIEF DESCRIPTION OF THE DRAWINGS

These and other features of the subject invention will be better understood in conjunction with the drawings of which.

DETAILED DESCRIPTION OF THE DRAWINGS

By way of further background, wire manufacturers in the past produced continuous webs by seaming the wires with silver solder after cutting between two shute wires and by running a continuous silver strand across the warp wires at the position of the missing shute wire. This resulted in a continuous belt with no variation in drainage.

In the past, when plastics came to be employed, there was no way of making this type seam and the web makers who were making continuous loop fabrics were limited by loom size. It will be appreciated that loops having circumferences in excess of 35 feet are necessary for papermaking processes. Alternatively, the past plastic webs were provided with a woven seam. The method of providing a woven seam is very time consuming in that it must be jigged up and done by hand. There was therefore a need to provide some type of welding for polyester woven cloth that would give a seam simulating the old type of seam and that could be accomplished quickly.

It will be appreciated that the above-mentioned 35 foot loop of mesh is commonly referred to as Fourdrinier machine clothing. This clothing is woven with strand sizes of 0.005 inches and up and the mesh can be as fine as 190×180 strands per square inch. When the ends of such a cloth of woven material are joined to make an endless belt, it is necessary to weld the material together with the smallest overlap possible to avoid filling the drainage pattern or to fill it as little as possible. The plane of the cloth both top and bottom must remain exactly the same at the seam as over the complete body. The woven cloth can be as little as 15 thousandths of an inch thick and therefore the seam can only be 15 thousandths of an inch thick. In general the belts of interest are 100 inches wide to 400 inches wide and 35 feet in circumference to 200 feet in circumference. Thus, what is required is an extremely fine material which is unwieldly in the size and lengths contemplated. It is a requirement for the subject invention that the woven cloth be heat-set after coming off the loom, with the web being seamed after heat setting. Moreover, in order to be useful for papermaking processes the seam must withstand a 150 pound per inch stress test.

Figure 1:
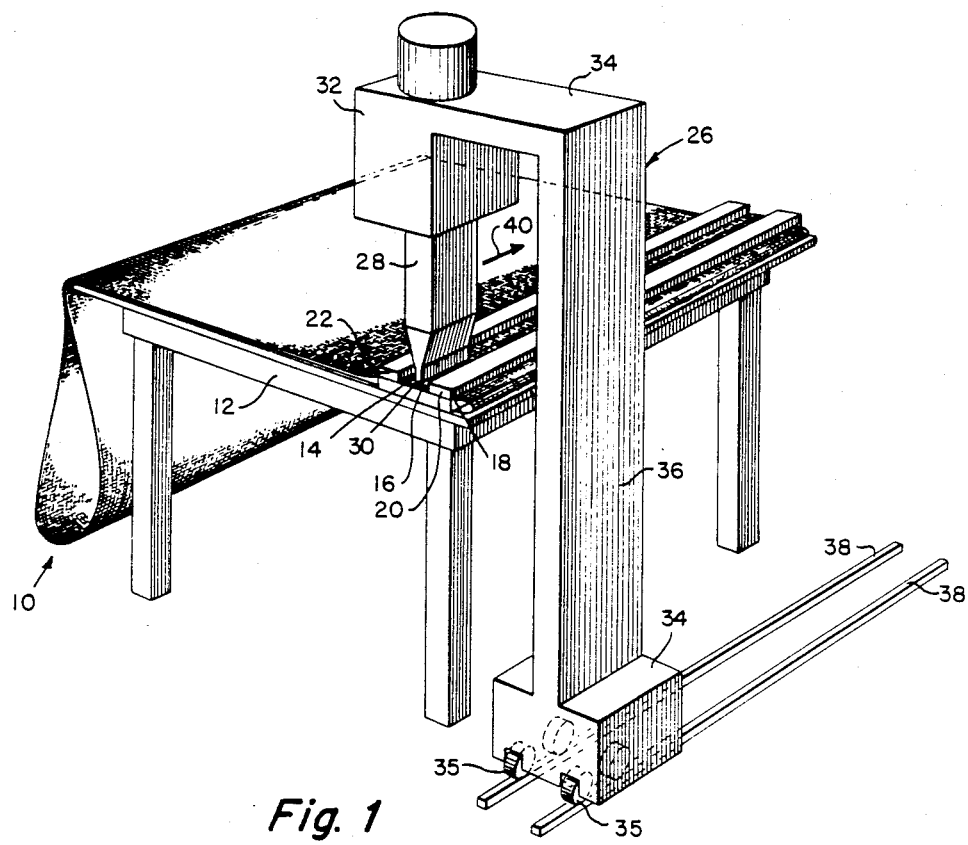
FIG. 1 is a diagrammatic illustration of a continuous loop web bonded at a seam through the utilization of a movable ultrasonic bonding head which traverses the width of the web along the seam.
Figure 2:
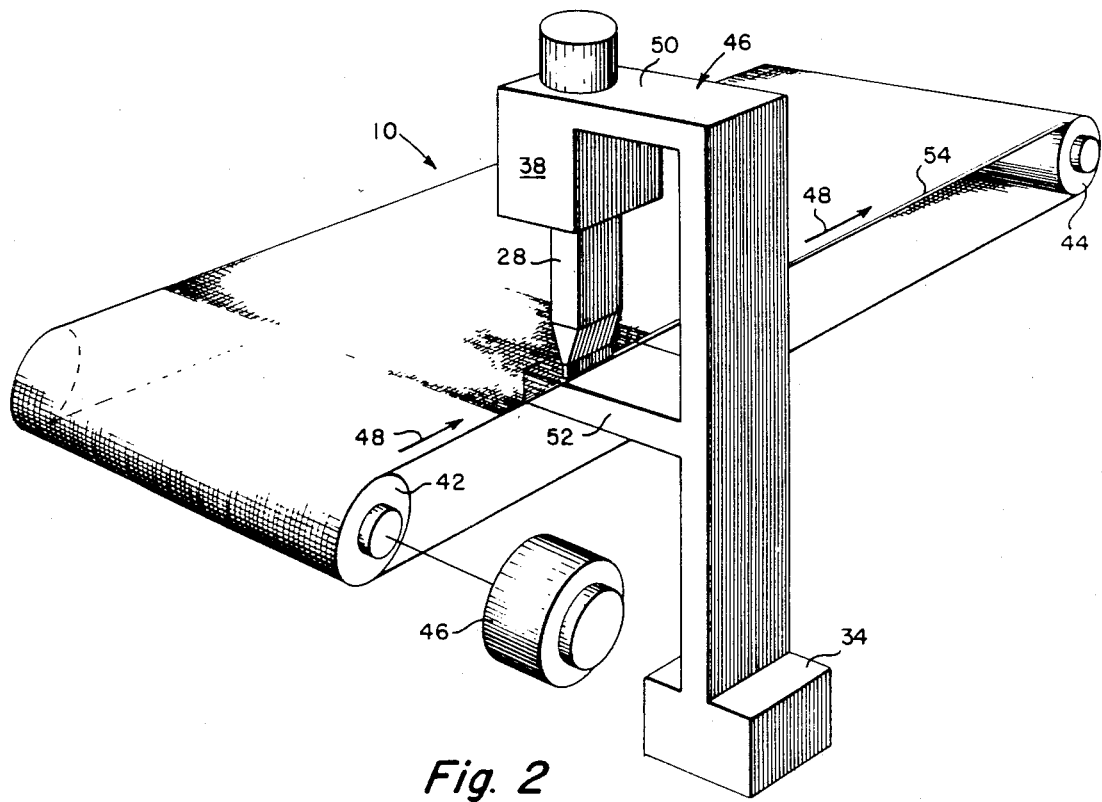
FIG. 2 is a diagrammatic illustration of the utilization of ultrasonic bonding for the edges of the web produced by the apparatus of FIG. 1.

Referring now to FIG. 1, a continuous loop web 10 has a portion which extends over a table or stand 12 with one end 14 abutting a second end 16 which has been reverse folded at 18 and is clamped in place by a horizontally extending bar 20. The opposing end of the web is clamped in opposition to end 16 by horizontally extending bar 22. Prior to welding through the utilization of a conventional welding machine 26 having a weld horn 28 which extends down to a seam 30, as will be described in connection with FIGS. 3-6, the free ends of the warp fibers of each of the butting ends are forced together so that they are interdigitated with the warp fibers of the opposing end and are welded to the shutes of the opposing butt end they overlap. The overlap welding process is made with a minimal overlap if the warp ends are cut or configured such that when forcing one butt end into the other, the fiber ends only overlie one of the shutes in the opposing end. Alternatively, the free ends of the fibers may overlie more than one shute, with the overlap being preferably maintained to a length less than 1½ times the thickness of the web.

The manner of interdigitation depends upon the characteristics of the original woven material, such that warps underlie or overlie the last shute in the opposing end in the same pattern as the weave provides. In one embodiment, the same welding machine may be utilized to provide a transverse cut for forming the butting ends.

This cut severs the warps to provide the warp ends and the associated nearest shute is then removed to expose a given length protrusion of each warp from the next adjacent shute.

By forcing the two butt ends of the cloth together, interdigitation naturally occurs in accordance with the woven pattern of the fabric such that certain of the warp ends will lie on top of the opposing shute, whereas others will be pushed underneath this shute, such that the warps underlie or overlie the last shute in the opposing web end in a random fashion.

While care may be taken to achieve the same type of woven pattern as originally established in the cloth, this is not critical, and the forcing together of the ends in a random fashion nonetheless provides for adequate interdigitation and overlap. While the subject invention will be described with the removal of one end shute per butted end, it will be appreciated if a larger overlap is desired, two or more shutes from each of the butt ends may be removed. It is, however, desirable to remove only one shute thereby to minimize the overlap of the warps with the opposing shutes.

The welding can be accomplished by an ultrasonic welder Model 8200-8400-8700 manufactured by Branson utilizing a Model F-10 horn or ultrasonic slitter. The material usually utilized for the web is made of polyethylene terephthalate, a commonly used thermoplastic material. Prior to the seaming, this material is heat-treated such that it is heat-set thereby to lock the cross-overs of the shute and warp strands into place. These cross-overs are beaten in by the loom sleigh and are referred to as "crimp". Before heat-setting the cloth, the warp and shute strands can move away from the position that the loom has originally woven, resulting in the loss of the proper openings. Unheat-set cloth will stretch under paper machine running conditions and will shrink approximately 5% at a temperature of 180° F. Thus unheat-set cloth is not acceptable for papermaking applications.

Referring to the Branson machine, it incorporates a weld head 32 to which is mounted the aforementioned horn, with weld head 32 being supported by a transverse brace 34 extending from an upright brace 36 mounted to a counterweight 34 which is provided with wheels 36 and a track comprising a pair of rails 38 which permits movement of horn 28 in the direction of arrow 40. In one embodiment, the mouth of the horn has a slotted face which is 6 inches long by ¾ of an inch wide and not only applies ultrasonic energy to the overlapped strands of the web, but also provides a pressure thereat towards the underlying platten so that when the strands are melted they flatten in the area of the seam down to the plane of the rest of the web.

Horn 28 is moved in the direction of arrow 40 so as to provide a continuous weld seam which occupies the same plane as that of the remainder of the web. In one embodiment, for a 100 inch wide web the power requirements are Line Voltage 200 Amps, Line Fuse 10 Amps, Line Current 9.8 Amps. Power is delivered to a converter unit which then delivers high voltage, low amperage 2,000 cycle electrical energy. The horn presents mechanical energy at a rate of 1,500 Mechanical Watts.

After the seam has been made in web 10, it is moved to a salvage edge reinforcing station where web 10 is mounted between rollers 42 and 44, with roller 42 being driven by a suitable motor 46. In this case, the same type of ultrasonic horn 28 may be mounted to the same type of head 38 which is mounted to a frame 46 which is fixed with respect to a web moved in the direction of arrows 48 during the welding process. Frame 46 includes a horizontal support 50, head 38 and a platten 52 with the web running between the platten and horn 28. Horn 28 is oriented such that its longitudinal axis is along the edge 54 of web 10 and the edge is continuously melted by the application of ultrasonic energy, thereby to provide a reinforced salvage edge.

Figure 3:
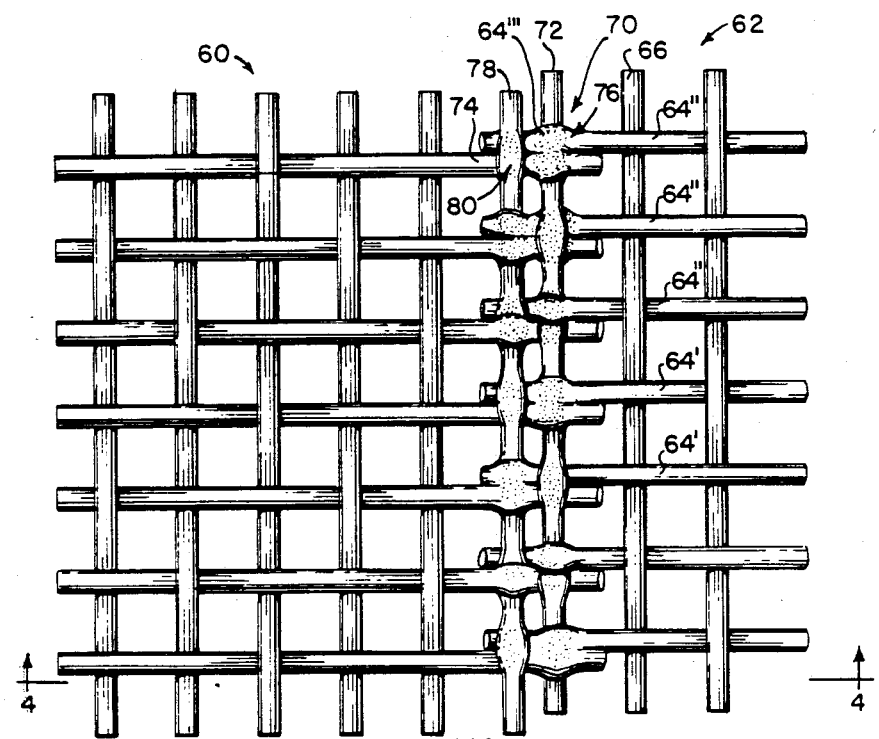
FIG. 3 is a top view of a portion of a continuous loop web illustrating the ultrasonically bonded seam in which interdigitation and a one shute overlap is employed.

Referring now to FIG. 3, the resulting seam for two web ends 60 and 62 is illustrated in which a pattern of warps 64 over shute 62 is such that two warps 64' overlie shute 66, whereas the next adjacent warp 64" runs underneath this shute. This particular weave is typical of a great many webs utilized in the papermaking process. The same type of pattern is utilized for the left hand butt edge 60. As can be seen by the region designated by reference character 70, a warp 64''' overlies a right hand shute 72 and is interdigitated with a warp 74 from end 60 which likewise lies on top of shute 72 prior to welding. During the welding process, warps 64''' and 74 are melted and squeezed downwardly to provide an extended flat depressed area 76 over shute 72. The top surface of this flat area is coplanar with the plane established by the average height of the top surfaces of warp 64" and 74. Note also that shute 78 associated with end 60 is also melted partially in the region indicated by reference character 80 due to the ultrasonic welding which is effectuated by a combination of heat and pressure applied at the weld seam.

Figure 4:
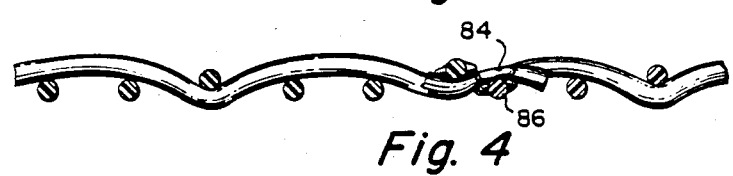
FIG. 4 is a cross-sectional and diagrammatic views of the flattened warps making up the ultrasonically bonded seam in the web of FIG. 3.

FIG. 4 shows a portion of the weld seam in which the flattened area indicated by line 84 is indicated with respect to a shute 86.

Figure 5:
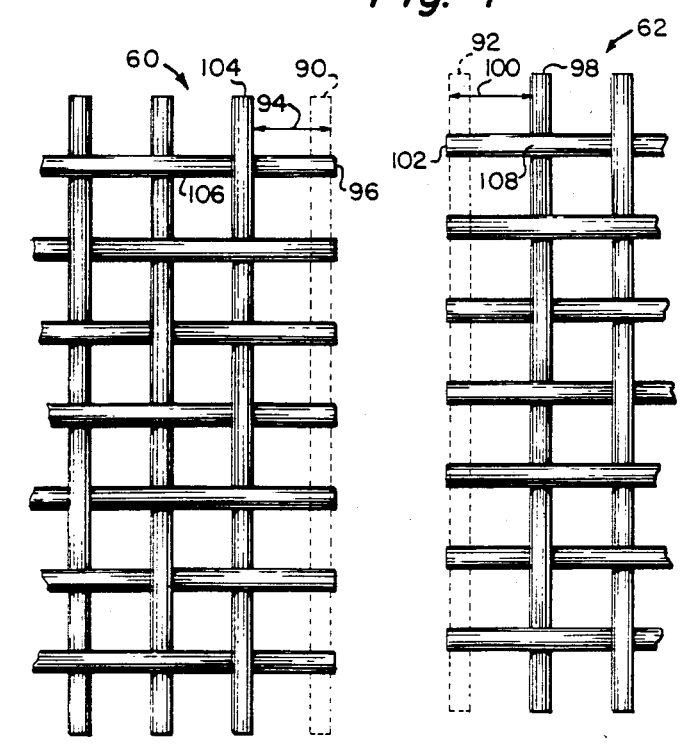
FIG. 5 is a top and diagrammatic view illustrating the butting edges of the continuous web prior to seaming, showing the removal of one shute from either butted edge.

Referring now to FIG. 5, prior to providing the seam, end 60 and end 62 have removed therefrom associated end shutes 90 and 92, thereby to provide an exposed length of warp indicated by arrow 94 which permits the overlap of, for instance, warp end 96 with shute 98 of end 62. This length is referred to as the length of the free end of a warp which controls the maximum overlap length. Likewise, the removal of shute 92 permits a similar overlap indicated by arrow 100 of end 102 with respect to shute 104. It will also be appreciated that the interdigitation is accomplished by the slight offset of warps 106 and 108 such that butting of the ends of the warps is prevented from occurring.

Having a single shute overlap for the respective warp ends provides a seam having a stress test strength in excess of 150 pounds per inch which is clearly sufficient for use in papermaking machinery. Moreover, the single shute overlap prevents occlusion of the spaces between the warps and the shutes so that proper drainage occurs. Most importantly, the plane of the seam does not significantly vary from the average plane of the web such that rippling at the seam is prevented from occurring in the solidifying sluice which is carried by the web.

Figure 6:
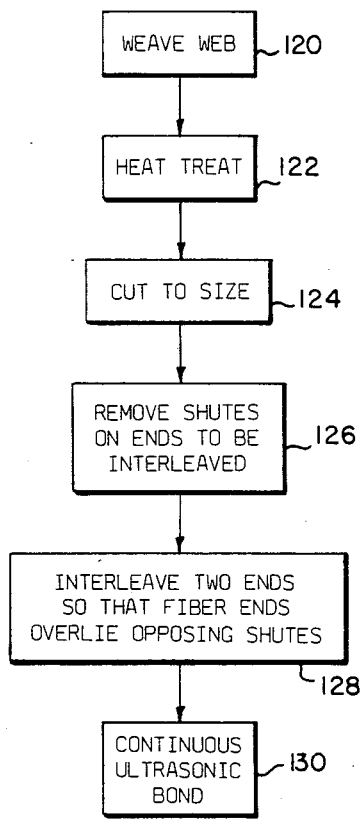
FIG. 6 is a block diagram illustrating the process steps utilized in the seaming of the webs of FIGS. 1-5.

Referring to FIG. 6, a method is shown for the preparation of the seam which involves the utilization of a woven web illustrated at 120 which is heat treated at 122. Thereafter the web, in this case polyethylene terephthalate, is cut to size at 124 as mentioned through the utilization of a Branson ultrasonic cutting head. Thereafter the end shutes are removed leaving so-called "pickets" or "warp ends" to be interleaved as described in connection with FIGS. 3-5. Alternatively, no shutes need be removed if minimum overlap is desired. The shute removal step is indicated as step 126, whereas the interdigitation or interleaving step is illustrated at 128.

The particular pattern of overlying or underlying a particular opposing shute, in a preferred embodiment, follows the pattern established by the initial web weave. Alternatively, the overlapping and interdigitation may be a random process due to the flattening during the ultrasonic welding process. Finally, the seam produced by the interleaving is ultrasonically bonded as illustrated at 130 to produce a continuous bonded seam through the movement of the welding head and horn transverse to the longitudinal axis of the web belt and along the seam line. Salvage edge finishing may then be provided by ultrasonic welding.

What is therefore provided is an extremely strong, flat and pliable seam line which is sufficiently porous to be utilized in the papermaking industry in place of a Fourdrinier wire device.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A method for bonding heat-set thermoplastic webs to provide a web loop for use as a Fourdrinier wire for papermaking processes comprising the steps of:
   providing a length of heat-set thermoplastic woven web, with the web having two free laterally running ends with warps projecting therefrom;
   removing a predetermined number of shutes from each of the ends;
   folding the web back on itself to form a loop having a longitudinal axis such that the opposite ends of the web are in spaced-apart opposition;
   interdigitating the warps of the opposed ends to form a seam by moving one web end toward the other web end such that a warp extending from one end overlies or underlies at least one shute of the other end; and
   ultrasonically bonding the overlain or underlain shutes to respective warps by placing the web seam between a platten and an ultrasonic welding head and moving the ultrasonic head transversely to the longitudinal axis of the web along the edges containing the interdigitated warps while the face of the welding head exerts a force directed towards the platten on the seam to provide a continuous bond across the web by ultrasonic welding and crushing down the warps over the corresponding shutes, such that a flat seam coplanar with the web is formed, whereby when the web loop is used in a papermaking process, the resulting solidifying sluice is substantially ripple and bump free over the seam and whereby liquid is permitted to pass through the web at the seam.

2. The method of claim 1 wherein the length of the overlap provided by the length of the free ends of the warps at one end is less than 1½ times the thickness of the web.

3. The method of claim 1 and further including the step of ultrasonically bonding the edges of the web.

4. The method of claim 1 wherein the interleaving matches the original woven pattern.

5. The method of claim 1 wherein the interleaving is random.

6. The method of claim 2 wherein the shute removing step takes place after the folding step.

7. The method of claim 2 wherein the warps of one end overlie or underlie only one shute of the opposing end.

8. The method of claim 1 wherein no shutes are removed.

9. The method of claim 1 wherein ultrasonic energy is applied continuously during movement of the ultrasonic welding head in the bonding step.

10. The product made by the method of claim 1.
11. The product made by the method of claim 2.
12. The product made by the method of claim 3.
13. The product made by the method of claim 4.
14. The product made by the method of claim 5.
15. The product made by the method of claim 6.
16. The product made by the method of claim 7.
17. The product made by the method of claim 8.
18. The product made by the method of claim 9.

* * * * *